United States Patent
Okamoto

(10) Patent No.: US 10,755,461 B2
(45) Date of Patent: Aug. 25, 2020

(54) DISPLAY DEVICE, DISPLAY METHOD, AND RECORDING MEDIUM

(71) Applicant: SHARP KABUSHIKI KAISHA, Sakai, Osaka (JP)

(72) Inventor: Kenshirou Okamoto, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/165,956

(22) Filed: Oct. 19, 2018

(65) Prior Publication Data
US 2019/0122405 A1    Apr. 25, 2019

(30) Foreign Application Priority Data

Oct. 20, 2017 (JP) ................ 2017-203816

(51) Int. Cl.
| G06T 11/60 | (2006.01) |
| G06F 3/0488 | (2013.01) |
| G06F 3/0484 | (2013.01) |
| G06F 3/0481 | (2013.01) |
| G06F 3/0354 | (2013.01) |

(52) U.S. Cl.
CPC .......... *G06T 11/60* (2013.01); *G06F 3/04845* (2013.01); *G06F 3/04883* (2013.01); *G06F 3/03545* (2013.01); *G06F 3/04817* (2013.01); *G06F 3/04842* (2013.01)

(58) Field of Classification Search
CPC ....... G06T 11/60; G09B 5/02; G06F 3/03545; G06F 3/04817; G06F 3/04845; G06F 3/04883; G06F 3/04842
See application file for complete search history.

(56) References Cited

U.S. PATENT DOCUMENTS

| 2012/0235934 A1* | 9/2012 | Kawasaki | G06F 3/03545 |
| | | | 345/173 |
| 2013/0100499 A1 | 4/2013 | Kobayashi | |
| 2013/0114913 A1* | 5/2013 | Nagarajan | G06F 3/0482 |
| | | | 382/306 |
| 2017/0220313 A1* | 8/2017 | Tsubone | G06F 3/1423 |

FOREIGN PATENT DOCUMENTS

| JP | 2010-146086 A | 7/2010 |
| JP | 2013-092875 A | 5/2013 |
| JP | 2015-041228 A | 3/2015 |

OTHER PUBLICATIONS

P2or, "Make an outline with GIMP, like in Photoshop", https://graphicdesign.stackexchange.com/questions/696/make-an-outline-with-gimp-like-in-photoshop, Nov. 2015 (Year: 2015).*

* cited by examiner

Primary Examiner — Nicholas R Wilson
(74) Attorney, Agent, or Firm — ScienBiziP, P.C.

(57) ABSTRACT

A display device includes a display unit that displays an object disposed in a layer on a display screen, an output unit that outputs the object, a mode switching unit that switches a mode between a first mode and a second mode, and an object disposing unit that disposes an object in a first layer when the mode is the first mode and disposes an object in a second layer when the mode is the second mode. The display unit displays the objects disposed in the first layer and the second layer. The output unit outputs the object disposed in the first layer.

10 Claims, 17 Drawing Sheets

FIG. 3

| OBJECT TYPE | OBJECT DATA |
|---|---|
| CIRCLE | CENTER = (100, 100), RADIUS = 20, THICKNESS = 2, COLOR = #000000 |
| STRAIGHT LINE | START POINT (30, 30), END POINT = (130, 100), THICKNESS = 4, COLOR = #000000 |
| FREE CURVED LINE | TRAJECTORY = (20, 23), (22, 23), (24, 21), (26, 23), THICKNESS = 3, COLOR = #FF0000 |
| STRAIGHT LINE | START POINT (40, 40), END POINT = (320, 200), THICKNESS = 4, COLOR = #000000 |
| CHARACTER | START POINT = (40, 40), CHARACTER = A B C D E F G H I J, CHARACTER SIZE = 36 pt, COLOR = #0000FF |

FIG. 17A

| OBJECT TYPE | OBJECT DATA | LAYER NAME |
|---|---|---|
| CIRCLE | CENTER = (100, 100), RADIUS = 20, THICKNESS = 2, COLOR = #000000 | LAYER 1 |
| STRAIGHT LINE | START POINT (30, 30), END POINT = (130, 100), THICKNESS = 4, COLOR = #000000 | LAYER 1 |
| FREE CURVED LINE | TRAJECTORY = (20, 23), (22, 23), (24, 21), THICKNESS = 3, COLOR = #FF0000 | LAYER 2 |
| STRAIGHT LINE | START POINT (40, 40), END POINT = (320, 200), THICKNESS = 4, COLOR = #000000 | LAYER 3 |

FIG. 17B

| LAYER NAME | STORE IN FILE | PRINT | DISPLAY ON ANOTHER TERMINAL DEVICE |
|---|---|---|---|
| LAYER 1 | DO | DO | DO |
| LAYER 2 | DO | DO NOT | DO |
| LAYER 3 | DO NOT | DO NOT | DO NOT |

DISPLAY DEVICE, DISPLAY METHOD, AND RECORDING MEDIUM

BACKGROUND

1. Field

The present disclosure relates to a display device and the like.

2. Description of the Related Art

In general, an electronic blackboard is known as a display device that enables displaying an image on a display unit, writing characters, and drawing. By utilizing such an electronic blackboard at a conference or the like, the user browses materials and writes a note in the materials, saves the written contents, prints it, and shares the display.

If content input onto the electronic blackboard is output in a portable document format (PDF) or the like thereby being converted into an electronic file or being output to a print device for printing, all the input contents such as an input line and an input character are stored and printed. Accordingly, in a case where there is content that a user does not want to output, that is, content that the user does not want to convert into an electronic file or content that the user does not want to print, among the input contents, the content is demanded to be erased by an eraser function or the like.

Furthermore, in a case where there is writing which is not desired to be converted into an electronic file or to be printed but is desired to be retained as content input onto the electronic blackboard, or in a case where there is writing which is converted into an electronic file but is not desired to be printed, it is desirable that the input content is stored as a separate file and the input content is deleted.

As a method of solving such a troublesome procedure, a method is proposed in which only the content selected by the user is stored and printed, a comment column is utilized, and the input content is managed for the selected layer and only the intended layer is stored and printed. In addition, a technology is also proposed in which a part of the input content is not stored or printed.

For example, a data processing device described in Japanese Unexamined Patent Application Publication No. 2015-41228 discloses a technology in which input character string data and graphic data include color attributes, and data matching a predetermined color is excluded from storage and print.

In addition, an information processing device described in Japanese Unexamined Patent Application Publication No. 2013-92875 discloses a technology that removes a line including a specific character (symbol such as ">") or a blank line from image data to be printed. Thereby, an image that a user is hard to see may not be printed, and the amount of the image data can be reduced.

In addition, a data distribution system described in Japanese Unexamined Patent Application Publication No. 2010-146086 discloses a technology that can select whether or not to store the input data from a setting screen when data input to an operation panel is stored. In addition, a function of being capable of designating a region where an input can be performed is disclosed.

In a case where the device or the system described in the above-described publication is applied to a display device, there is a problem that the user has to perform an input while being conscious of what color attribute is to be excluded from storage and print, or has to perform an input with a specific symbol, and therefore a troublesome operation of the user is not reduced. In addition, in a case where content that a user wants to store is a part of the input content, only the selection of whether or not to store all of the input content may not realize processing of storing only a part of the input content.

Furthermore, there is a problem that, in a case where the region where an input can be performed is determined, a freedom degree of writing decreases. In addition, there is a problem that, in a case where processing is changed according to a layer, a user has to be aware of how the currently input layer is processed and it is hard to move the input content to another layer.

SUMMARY

It is desirable to provide a display device and the like which enables designation whether an object disposed in the display device is processed normally or differently and enables appropriate display and output based on the designated processing.

According to an aspect of the disclosure, there is provided a display device including a display unit that displays an object disposed in a layer on a display screen, an output unit that outputs the object, a mode switching unit that switches a mode between a first mode and a second mode, and an object disposing unit that disposes an object in a first layer when the mode is the first mode and disposes an object in a second layer when the mode is the second mode. The display unit displays the objects disposed in the first layer and the second layer, and the output unit outputs the object disposed in the first layer.

According to another aspect of the disclosure, there is provided a display method including displaying an object disposed in a layer on a display screen, outputting the object, switching a mode between a first mode and a second mode, and disposing an object in a first layer when the mode is the first mode and disposing an object in a second layer when the mode is the second mode. In the displaying, the objects disposed in the first layer and the second layer are displayed, and, in the outputting, the object disposed in the first layer is output.

According to still another aspect of the disclosure, there is provided a recording medium storing a program for causing a computer mounted in a display device to execute functions including displaying an object disposed in a layer on a display screen, outputting the object, switching a mode between a first mode and a second mode, and disposing an object in a first layer when the mode is the first mode and disposing an object in a second layer when the mode is the second mode. In the displaying, the objects disposed in the first layer and the second layer are displayed, and, in the outputting, the object disposed in the first layer is output.

BRIEF DESCRIPTION OF THE DRAWINGS

FIG. 3 is a diagram illustrating an example of a data configuration of drawing information according to the first embodiment;

FIGS. 17A and 17B are diagrams illustrating an example of a data configuration of an object according to a sixth embodiment;

DESCRIPTION OF THE EMBODIMENTS

Hereinafter, embodiments according to the present disclosure will be described with reference to the drawings. In the present embodiment, a conference support system which uses an electronic blackboard as a display device according to the present disclosure will be described as an example.

1. First Embodiment

1.1 Entire Configuration

Figure 1:
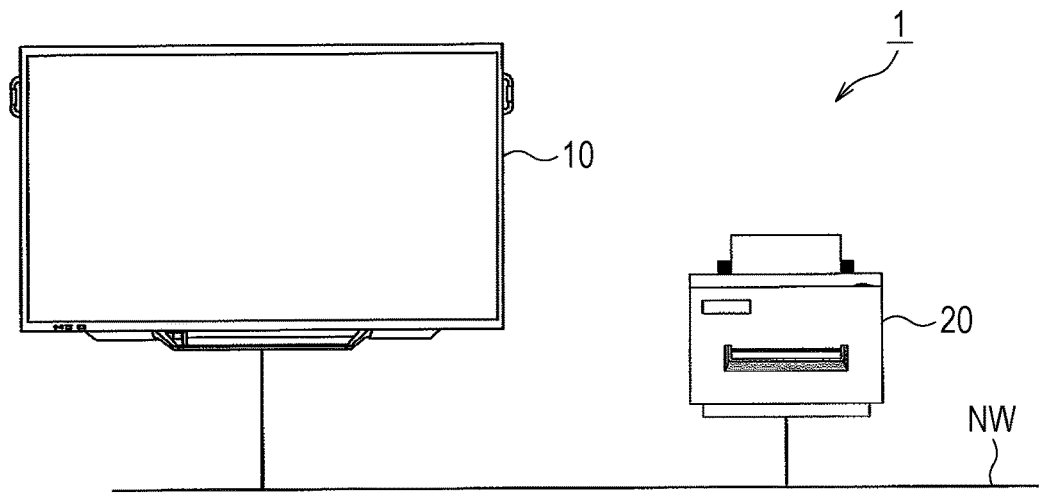
FIG. 1 is a diagram illustrating the entire configuration of a conference support system according to a first embodiment.

First, the entire configuration of a conference support system 1 according to the present embodiment will be described with reference to FIG. 1. As illustrated in FIG. 1, a display device 10 and a print device 20 are connected to the conference support system 1 via a network NW. FIG. 1 illustrates that the display device 10 and the print device 20 are connected to each other via the same network such as a local area network (LAN), but the devices may also be connected via an external network such as the Internet. In addition, the display device 10 and the print device 20 may be directly connected to each other via the universal serial bus (USB) or the like.

The display device 10 has a configuration in which a large-screen display unit 120 is provided in a rectangular casing, the display unit 120 is placed in an upright state, content is displayed on the display unit 120, and a user can perform an operation of inputting, for example, a character, a drawing, or the like through a touch operation. A device that performs displaying and receives an input operation from the user may be used as the display device 10, and, in addition to a stationary display device that can be used for an electronic blackboard, for example, a portable device such as a tablet terminal or a touchable computer may be used therefor. In addition, one or a plurality of the print devices 20 can be connected, but the devices may not be connected depending on the embodiment.

1.2 Functional Configuration

Figure 2:
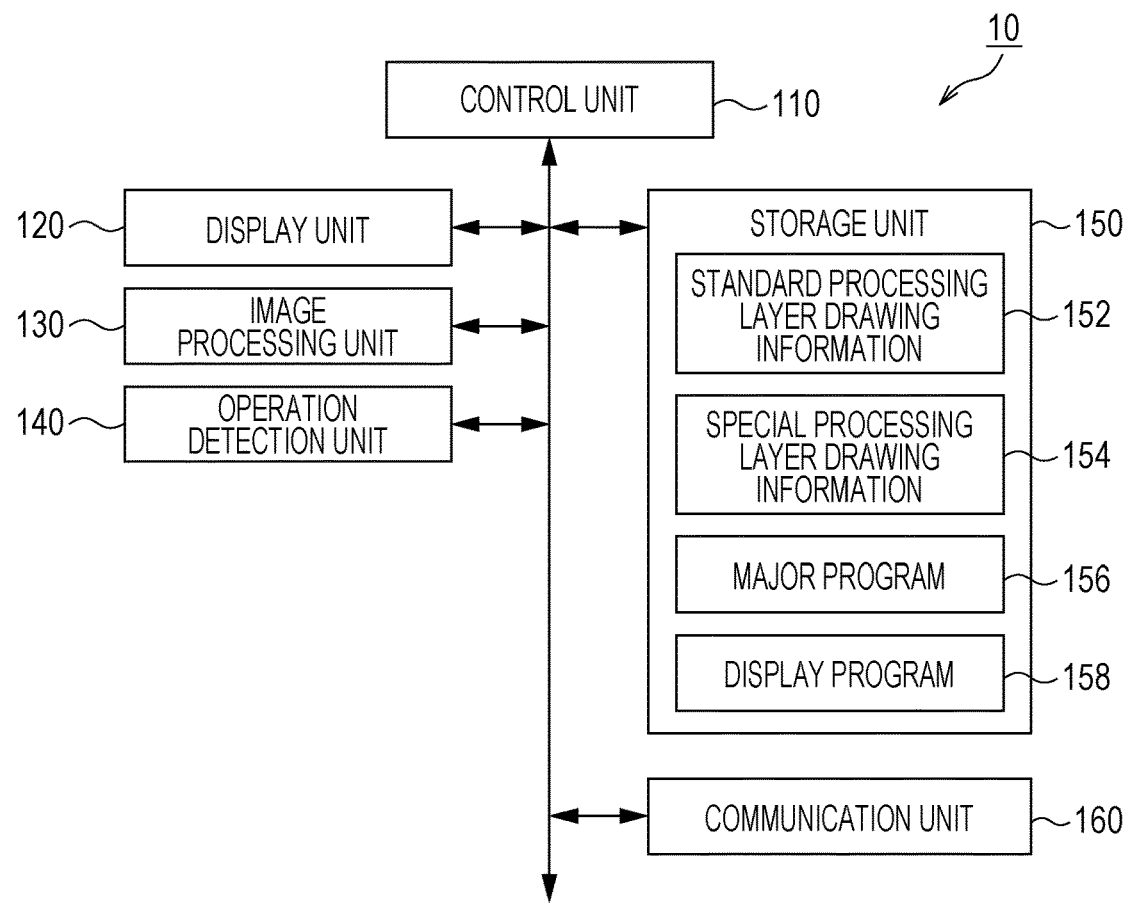
FIG. 2 is a diagram illustrating a functional configuration of an electronic blackboard according to the first embodiment.

Subsequently, a functional configuration of the display device 10 will be described with reference to FIG. 2. The display device 10 includes a control unit 110, a display unit 120, an image processing unit 130, an operation detection unit 140, a storage unit 150, and a communication unit 160.

The control unit 110 is a functional unit that controls the entire display device 10. The control unit 110 realizes various functions by reading and executing various programs stored in the storage unit 150, and is configured by, for example, a central processing unit (CPU) or the like.

The display unit 120 is a functional unit that displays various types of information. The display unit is configured by, for example, a liquid crystal display (LCD), an organic EL display, or the like.

The image processing unit 130 is a functional unit that processes image data to be displayed on the display unit 120. For example, the image processing unit 130 acquires stroke data from the drawn information, outputs the data as an image, and performs various types of image processing such as sharpening processing of an image to be displayed. In addition, an image to be displayed on the display unit 120 is processed from drawing information stored in standard processing layer drawing information 152 and special processing layer drawing information 154.

The operation detection unit 140 is a functional unit that can detect an input from a user. In the present embodiment, the operation detection unit 140 is formed as a touch panel to be integral with the display unit 120. A finger of the user may be used, or an operation pen may be used, as a touching method. The operation pen is a touch pen, a stylus pen, or the like, which may be configured by a simple resin or may be an electronic pen which can detect an operation. Furthermore, the operation pen may be identified by using unique identification information (for example, a serial number, a MAC address, or the like) that can identify the operation pen.

The storage unit 150 is a functional unit in which various programs demanded for the operation of the display device 10 and various types of data are stored. The storage unit 150 is configured by, for example, a semiconductor memory, a hard disk drive (HDD), or the like.

Here, the standard processing layer drawing information 152, the special processing layer drawing information 154, a major program 156, and a display program 158 are stored in the storage unit 150. The standard processing layer drawing information 152 and the special processing layer drawing information 154 are information (drawing information) expressing one or a plurality of elements, which are displayed on the display unit 120, such as a straight line, a free curved line, a rectangle, and a character, and the elements are called an object. A standard processing layer (first layer) and a special processing layer (second layer) will be described below.

An example of drawing information will be described with reference to FIG. 3. In the present example, the drawing information is expressed as a table that stores an object type and object data, for each object. The object type is information representing the type of the object, and includes, for example, types such as a "straight line", a "free curved line", a "circle", and a "character". In addition, the object data stores attributes demanded for expressing the object indicated by the object type. For example, if the object is a free curved line, coordinates of a start point and an end point as coordinates (trajectory) through which the line passes, a thickness of the line, and a color of the line are stored. In addition, if the object is a circle, coordinates of the center of the circle, a size of a radius of the circle, a thickness of the line, and a color of the line are stored.

Besides this, it is needless to say that a type of object may be prepared (for example, a polygon, an ellipse, a stamp, or the like). In addition, attributes may also be added appropriately if demanded (for example, a color in a case of filling, an angle, a name of the user who has drawn the object, or the like).

The drawing information may not be stored using the method illustrated in FIG. 3 and may be stored using any expression method as long as one or a plurality of objects can be expressed appropriately. For example, stroke data for each object may be stored, metadata indicating graphics may be stored, or image data such as a JPG format may be stored.

The major program 156 stored as a program is read and executed by the control unit 110, and thereby, major processing (FIGS. 5 and 6) which will be described below is performed. In addition, the display program 158 is read to be executed by the control unit 110, and thereby, display processing (FIG. 7) which will be described below is performed.

The communication unit 160 is a functional unit that enables connection to another device, a network, or the like. For example, the communication unit 160 is a LAN interface connected to the network NW, a USB interface connected to another device, or the like.

1.3 Concept Description on Present Embodiment

Figure 4A:
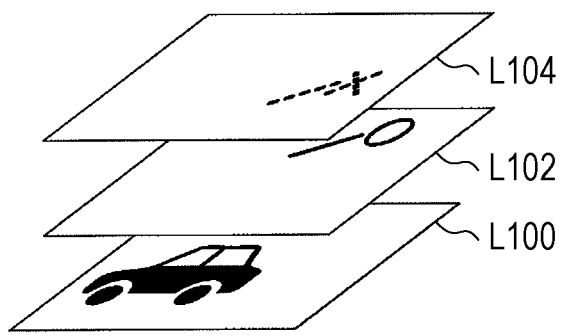
FIGS. 4A to 4F are diagrams illustrating a concept of a layer according to the first embodiment.

Subsequently, a basic concept of the present embodiment will be described based on FIGS. 4A to 4F. FIG. 4A is a diagram illustrating a layer according to the present embodiment. The layer is a processing layer in which an object such as graphics, a character, and an image can be arranged, and a plurality of such layers are provided. The present embodiment includes a background layer L100 that may not be changed, a standard processing layer L102 as a processing layer in which a user can dispose the object, and a special processing layer L104.

That is, all the objects are disposed in one of the standard processing layer and the special processing layer. Here, the objects disposed in the processing layer (the standard processing layer L102 and the special processing layer L104) are displayed on a display screen. The object disposed in the standard processing layer L102 can be output to the print device 20 according to an instruction of a user. However, the object disposed in the special processing layer L104 is not output to the print device 20 or the like which is a device other than the display device 10. Depending on the instruction or setting of the user, the object in the special processing layer L104 may be superimposed on the standard processing layer L102 and may be output as one image.

Figure 4B:
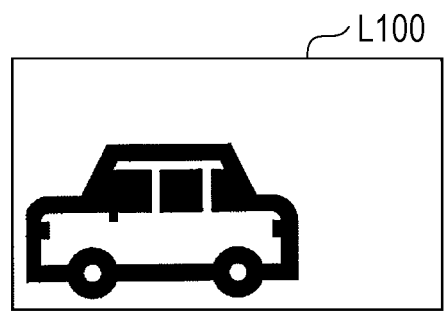
Figure 4C:
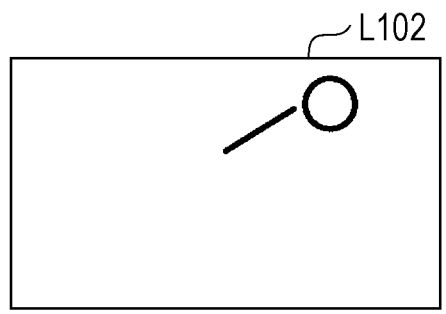
Figure 4D:
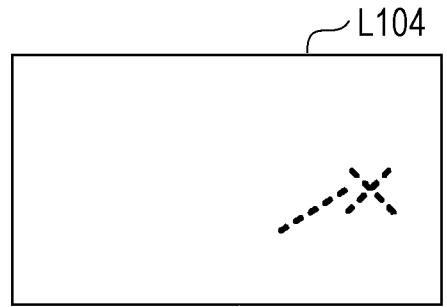

Specific description will be made with reference to FIGS. 4A to 4F. For example, FIG. 4B illustrates the object disposed as a background in the background layer L100, and FIG. 4C illustrates the object (object on the standard processing layer) disposed in the standard processing layer L102. In addition, FIG. 4D illustrates the object (object on the special processing layer) disposed in the special processing layer.

In addition, although the object on the special processing layer is illustrated with a dotted line in the present embodiment the object or a predetermined region including the object may be displayed, for example, in a thin color, or with a transmittance changed. That is, a display aspect may be appropriately changed to perform display such that a user can recognize the object being in the special processing layer.

The background layer L100 becomes a target of each processing such as displaying, printing, storing, and the like, but is a layer in which content input by the user may not be reflected. That is, the background layer is a layer in which an object may not be disposed.

Since each of the background layer L100, the standard processing layer L102, and the special processing layer L104 is a layer, image data with the layers superimposed is output to the display unit 120 of the display device 10.

Figure 4E:
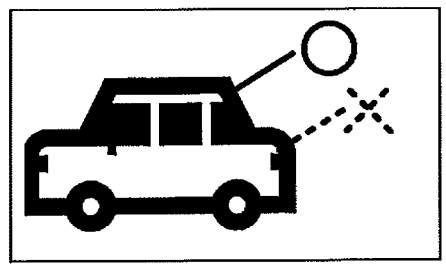

Here, in the present embodiment, the background layer L100, the standard processing layer L102, and the special processing layer L104 are superimposed to be displayed on the display unit 120 of the display device 10. For example, FIG. 4E illustrates a state in which the three layers are superimposed to be displayed. The display is performed on the display unit 120 in the state of FIG. 4E.

Figure 4F:
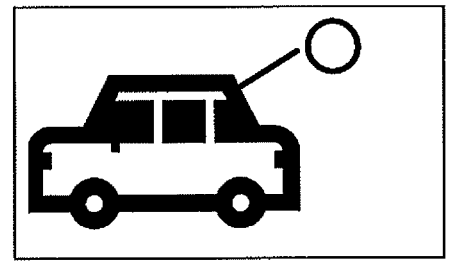

Meanwhile, in a case of being output to the print device 20 for printing, the object disposed in the special processing layer L104 is not printed. Thus, in a case of being printed. FIG. 4F illustrates a state in which the background layer L100 and the standard processing layer L102 are superimposed to be output.

As described above, the present embodiment provides a plurality of layers, and depending on the purpose, a user can dispose or draw an object to an appropriate position through an easy operation. The layers are described as being three layers in FIGS. 4A to 4F, but may be more than three, or may be less than three (for example, only the standard processing layer and the special processing layer).

In the following description, it is assumed that the layer has the special processing layer and the standard processing layer that can characteristically describe the present embodiment.

1.4 Processing Flow 1.4.1 Major Processing

A flow of the major processing according to the present embodiment will be described with reference to FIG. 5 and FIG. 6. The major processing is performed as the control unit 110 reads the major program 156 from the storage unit 150 and executes the program.

First, whether or not a drawing operation is performed by a user is determined (step S102). The drawing operation means that a user performs an input operation on a region where an object such as a character or graphics can be added or deleted by using a finger, an operation pen, or the like. In a case where the drawing operation is performed, processing of step S120 which will be described below is performed (step S102; Yes→step S120).

In a case where the drawing operation is not performed, whether or not an icon is selected is determined (step S102; No→step S104). If the icon is selected (step S104; Yes), whether or not the selected icon is a print icon is determined (step S106). If the selected icon is a print icon, the object on the standard processing layer is printed to be output (step S106; Yes it→step S108). Thereafter, the processing returns to step S102. That is, the object disposed in the standard processing layer L102 in FIGS. 4A to 4F is printed, and the object disposed in the special processing layer L104 in FIGS. 4A to 4F is not printed. If there is a background layer, the background layer may be printed together with the standard processing layer.

Subsequently, whether or not the icon selected by a user is a special drawing icon (a mode switching button) for drawing on the special processing layer (step S106; No→s- tep S110) is determined. A case where the selected icon is not the special drawing icon will be described below (step S110; No). In a case where the selected icon is the special drawing icon, whether or not a current operation mode is a normal drawing mode (first mode) is subsequently determined (step S110; Yes→step S112).

Here, the "operation mode" indicates an aspect in which an input to the display device 10 is performed by a user. The "normal drawing mode" means that, in a case where input to the display unit 120 is made by using a finger, an operation pen, or the like, an object recognized based on the input is disposed in the standard processing layer, that is, the disposed object is stored in the standard processing layer drawing information 152.

In a case where the current operation mode is the "normal drawing mode", the operation mode is set to the "special drawing mode" (second mode) (step S112; Yes→step S114). In addition, in a case where the current mode is not the "normal drawing mode" (that is, in a case of the special drawing mode), the operation mode is set to the "normal drawing mod" (step S112; No→step S116). In this manner, the user selects the special drawing icon, and thereby, the operation modes of the "normal drawing mode" and the "special drawing mode" are switched. Here, the "special drawing mode" means that, in a case where input to the touch panel (operation detection unit 140) is made by using a finger, an operation pen, or the like, the object recognized based on the input is disposed in the special processing layer (the disposed object is stored in the special processing layer drawing information 154).

Subsequently, whether or not the drawing operation is performed by a user is determined (step S118). Processing content is the same as the content in step S102.

In a case where the drawing operation from the user is detected in the above-described step S102 or S118, whether or not the current operation mode is the "normal drawing mode" is determined (step S120).

If the current operation mode is the "normal drawing mode", the input object is disposed in the standard processing layer, based on the drawing operation performed in step S102 or S118 (step S120; Yes→step S122). That is, the drawing operation performed in step S102 or S118 is recognized, an object is generated based on the recognized operation, and the generated object is stored in the standard processing layer drawing information 152.

In a case where the current operation mode is not the "normal drawing mode", that is, in a case of the "special drawing mode", the input object is disposed in the special processing layer, based on the drawing operation performed in step S102 or S118 (Step S120; No→step S124). That is, the drawing operation performed in step S102 or S118 is recognized, an object is generated based on the recognized operation, and the generated object is stored in the special processing layer drawing information 154.

Subsequently, whether or not an icon is selected by the user is determined (step S126). In a case where the icon is not selected, the processing returns to step S118 again and the processing is repeated (step S126; No). In a case where the icon is selected by the user, the processing returns to step S106 to determine the selected icon (step S126; Yes).

The processing in a case where the special drawing icon is not selected in step S110 of FIG. 5 will be described with reference to FIG. 6. Initially, whether or not the special processing icon is selected is determined (step S152). In a case where the special processing icon is selected by the user, the operation mode is set to the special processing mode (step S152; Yes→step S154). In a case where the special processing icon is not selected by the user, the operation mode is set to the normal processing mode (step S152; No→step S156).

Here, the special processing mode refers to a mode in which processing of moving an object, which is selected by the user and is on the standard processing layer, onto the special processing layer is performed. In addition, the normal processing mode is a mode in which processing of moving the object, which is selected by the user and is on the special processing layer, onto the standard processing layer is performed.

As for the selection of the object, any method may be used as long as an object desired by the user can be selected. For example, when the user presses the tip of a finger or an operation pen against the display unit 120 (touch down), the tip of the finger or the operation pen is moved as it is, and an operation of separating the tip of the finger or the operation pen from the display unit 120 (touch up), the object included in the range traced from the touch down to the touch up may be selected as the selected object. In the present embodiment, it is assumed that an object is selected by using the method.

In addition to the method described above, as an object selecting method, the object included in the region, in which a rectangle having the touch-down coordinates and the touch-up coordinates as a vertex of a diagonal line is regarded as the region selected by the user, may be the selected object. In addition, a region surrounded by a curved line with the touch-down coordinates as a start point and the touch-up coordinates as an end point may be the region selected by the user, and the object included in the region may be the selected object. In addition, the user may directly select one or a plurality of objects by touching those.

Subsequently, whether or not an object selection operation is performed is determined. (step S158). In a case where the object selection operation is performed, then, whether or not the current operation mode is the special processing mode is determined (step S158; Yes→step S160).

If the current operation mode is the special processing mode, the object which is the selected object and is on the standard processing layer is moved to the special processing layer (step S160; Yes→step S162). That is, among the objects selected in step S158, the object stored in the standard processing layer drawing information 152 is read, and the read object is copied to the special processing layer drawing information 154, and, meanwhile, processing of deleting the object from the standard processing layer drawing information 152 is performed. Thereby, among the objects included in the standard processing layer drawing information 152, the object selected by the user is moved to the special processing layer drawing information 154.

In addition, if the current operation mode is the normal processing mode, the object which is included in the selected region and included in the special processing layer is moved to the standard processing layer (step S160; No→step S164). That is, among the objects included in the standard processing layer drawing information 152, the object selected by the user is moved to the special processing layer drawing information 154.

Subsequently, whether or not an icon is selected is determined (step S166). If the icon is not selected, the processing returns to step S158 again (step S166; No). In a case where the icon is selected, the processing returns to step S106 of FIG. 5 in order to determine which icon is selected (step S166; Yes).

As described above, according to the present processing, when the user draws, by simply selecting an icon, the user can draw or dispose the object without being conscious of the standard processing layer and the special processing layer.

In addition, the user can intuitively move previously disposed objects between the standard processing layer and the special processing layer through an easy operation. Thereby, it is possible for the user to easily select, for example, whether the object is only an object to be displayed or is an object also demanded to be printed.

1.4.2 Display Processing

Processing (display processing) of displaying objects disposed in the standard processing layer and the special processing layer will be described with reference to FIG. 7. The display processing may be performed in parallel with the major processing illustrated in FIGS. 5 and 6, or may be performed by a predetermined operation (for example, an operation in which a screen update button is displayed on the display unit 120, and the user selects the button). The display processing is performed as the control unit 110 reads the display program 158 from the storage unit 150 and executes the program.

Initially, the object stored in the standard processing layer drawing information 152 is read (step S182), and the read object is disposed in the standard processing layer and displayed on the display unit 120 (step S184).

Subsequently, the object stored in the special processing layer drawing information 154 is read (step S186), and the read object is disposed in the special processing layer and displayed on the display unit 120 (step S188). Thereby, the object disposed in the standard processing layer and the object disposed in the special processing layer are displayed on the display unit 120.

1.5 Operation Example

Figure 8:
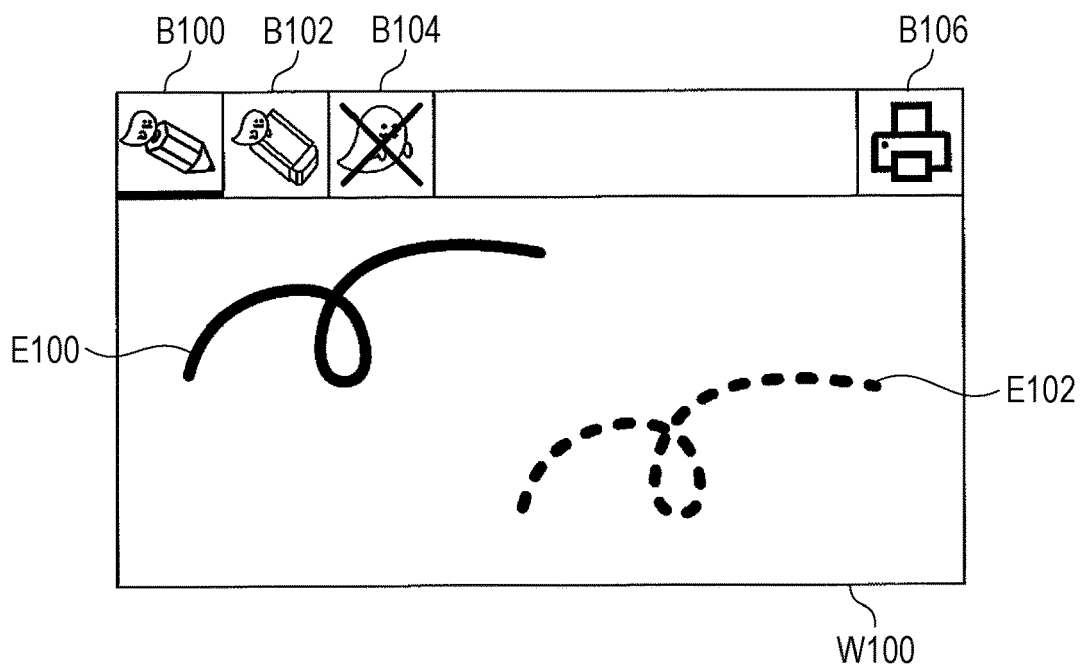
FIG. 8 is a diagram illustrating an operation example according to the first embodiment.

An operation example will be described with reference to FIGS. 8 to 10B. FIG. 8 is a diagram illustrating an example of a display screen W100 in the display device 10. A special drawing icon B100, a special processing icon B102, a normal processing icon B104, and a print icon B106 are displayed at an upper portion of a screen in the display screen W100 of the display unit 120, as icons for instructing switching of a mode and outputting. In addition, an object E100 and an object E102 are objects of lines input by a user. Among the objects, the object E100 is on the standard processing layer and the object E102 is on the special processing layer.

As illustrated in the display screen W100, the icon is not demanded to be displayed all the time on the upper portion of the screen, and any display method may be used as long as a user can appropriately instruct switching of the mode and coloring. For example, the icon may be displayed by making a specific gesture, a character may be displayed instead of the icon, or a menu format may be displayed.

In addition, each icon may be displayed as demanded. For example, if there is no print function, the print icon B106 may not be displayed.

By selecting any one of the special drawing icon B100, the special processing icon B102, and the normal processing icon B104, the operation mode can be switched.

A display aspect may be changed so as to identify the object is which of the object on the standard processing layer and the object on the special processing layer. In the example of FIG. 8, the object on the standard processing layer is denoted by a solid line, and the object on the special processing layer is denoted by a dotted line. In addition, the object may be displayed in other display modes. For example, the object on the special processing layer may be displayed in a thin color (thin color display) or may be displayed transparently, as compared with the object on the standard processing layer. In this case, setting of lightness and transmittance of the display of the object on the special processing layer may be a specified value or may be changed by a user. In addition, a predetermined region including the object on the special processing layer may be surrounded by a frame for display (frame display).

In addition, in a case of a character, a character modification may be performed, or background processing may be performed. In addition, the entire object may be surrounded by a frame, or may be blinkingly displayed.

Figure 9A:
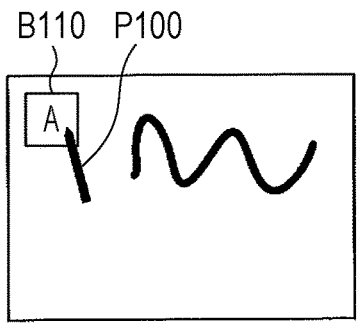
FIGS. 9A to 9I are diagrams illustrating an operation example according to the first embodiment.
Figure 9B:
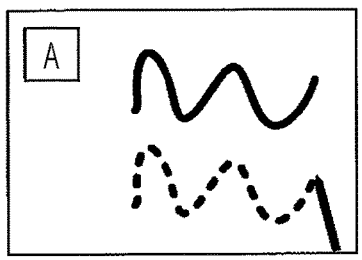
Figure 9C:
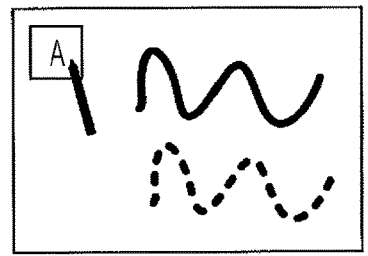

In addition, FIGS. 9A to 9I are specific examples of the special drawing mode, the special processing mode, and the normal processing mode. FIGS. 9A to 9C are examples of behaviors in the special drawing mode. Here, B110 is referred to as a special drawing icon and P100 is referred to as an operation pen. Initially, the special drawing icon B110 is selected (FIG. 9A). At this time, the operation mode of the display device 10 become a special drawing mode. Subsequently, a drawing operation is performed from the left to the right of the display screen (FIG. 9B). Since the drawing operation is performed in the special drawing mode, the object recognized during the drawing operation is stored as the object on the special processing layer. Thus, as illustrated in FIG. 9B, the object is indicated with a dotted line representing that the input line is the object on the special processing layer. Furthermore, by selecting the special drawing icon again, the operation mode returns to the normal drawing mode.

Figure 9D:
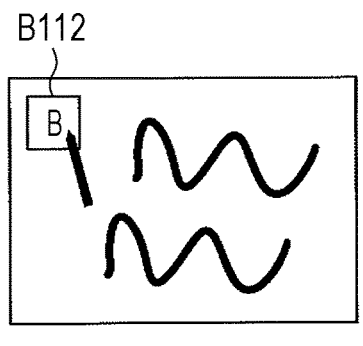
Figure 9E:
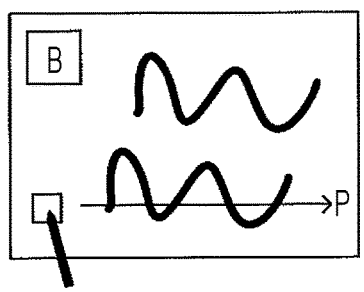
Figure 9F:
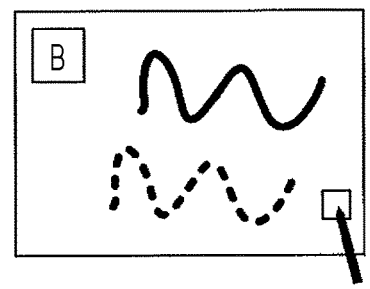

FIGS. 9D to 9F are examples of behaviors in the special processing mode. Here, B112 is referred to as a special processing icon. Initially, the special processing icon B112 is selected (FIG. 9D). At this time, the mode of the display device 10 becomes the special processing mode. Subsequently, an object selection operation is performed (FIG. 9E). In the example of FIG. 9E, a rectangle is displayed at the position of the tip of the operation pen. When the operation pen is moved, the rectangle follows and the object overlapping the following rectangle is recognized as an object selected by a user. It is assumed that a state illustrated in FIG. 9F is obtained by moving the operation pen in a direction P of FIG. 9E. At this time, since a lower line among the two lines in FIG. 9F is selected, the lower line moves from the standard processing layer to the special processing layer.

The timing at which the line moves from the standard processing layer to the special processing layer may be the timing at which the pen traces over the object and completes the tracing, or may be the timing at which the pen touches up. In addition, the timing may be the timing at which all the operations are completed and the completion operation (for example, a completion icon is displayed and the completion icon is touched) is performed.

Figure 9G:
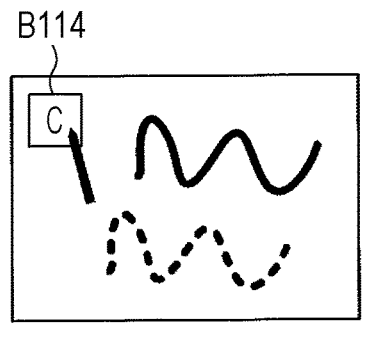
Figure 9H:
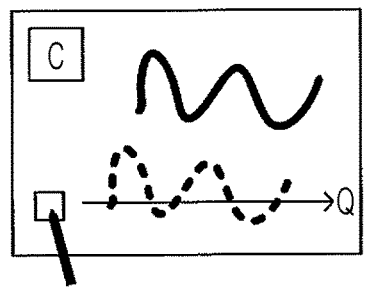
Figure 9I:
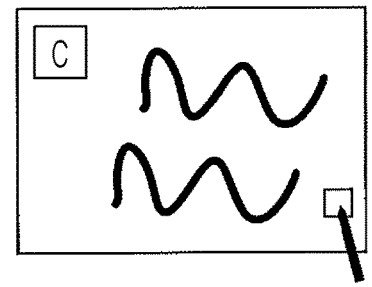

FIGS. 9G to 9I are examples of behaviors in the normal processing mode. Here, B114 is referred to as a normal processing icon. Initially, the normal processing icon B114 is selected (FIG. 9G). At this time, the mode of the display device 10 becomes the normal processing mode. Subsequently, an object selection operation is performed (FIG. 9H). In the example of FIG. 9H, a rectangle is displayed at the position of the tip of the operation pen. when the operation pen is moved, the rectangle follows and the object overlapping the rectangle is recognized as an object selected by a user. It is assumed that a state illustrated in FIG. 9I is obtained by moving the operation pen in a Q direction of FIG. 9H. At this time, since a lower line among two lines in FIG. 9I is selected, the lower line moves from the special processing layer to the standard processing layer. After the movement, the display aspect may be changed depending on the processing layer.

In this case, the timing at which the line moves from the special processing layer to the standard processing layer may be the timing at which the pen traces over the object and completes the tracing or may be the timing at which the pen touches up. In addition, the timing may be the timing at which all the operations are completed and the completion operation (for example, touching the completion icon) is performed.

In the special processing mode and the normal processing mode, in order to facilitate the operation of selecting the object, a rectangle or another graphic may be displayed following the operation of the operation pen as described above, and the rectangles or another graphic may not be displayed at the tip of the operation pen. That is, the display to enable selection of the object may be performed by using an appropriate method, and a special display may not be performed.

Figure 10A:
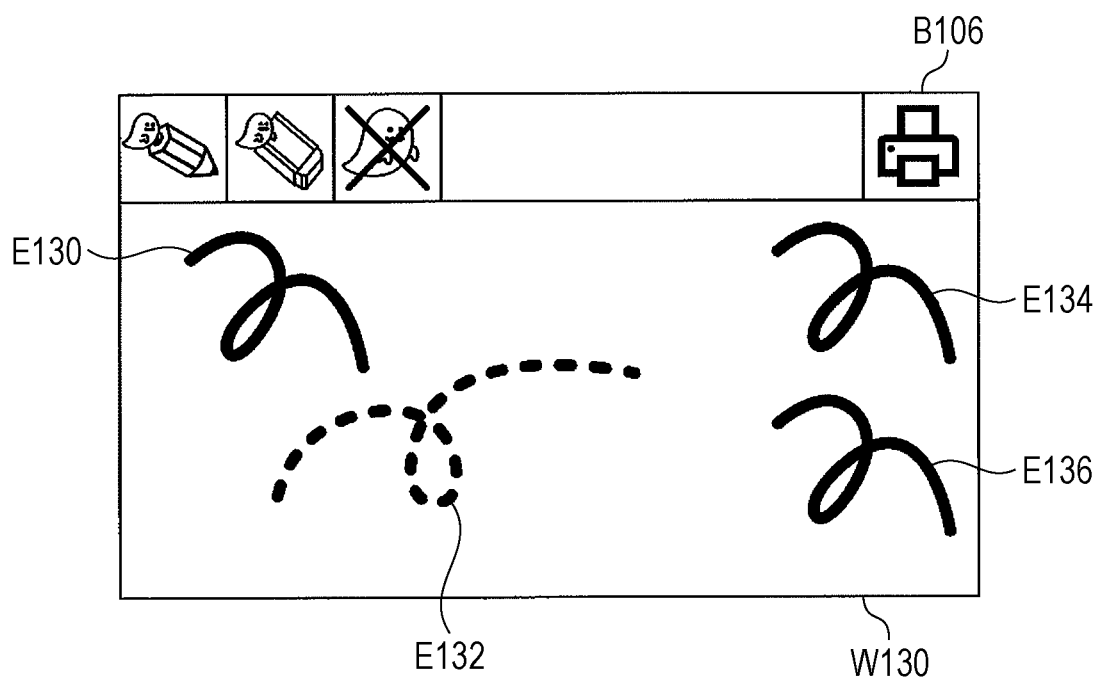
FIGS. 10A and 10B are diagrams illustrating an operation example according to the first embodiment.
Figure 10B:
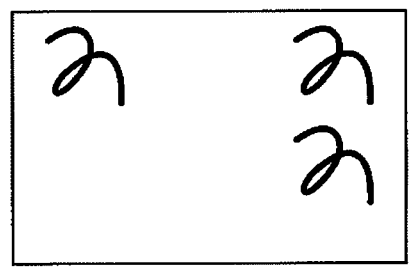

FIGS. 10A and 10B are diagrams illustrating an example of the display screen W130 of the display unit 120 of the display device 10 and a print result of the print device 20. For example, it is assumed that the display screen W130 is in a state illustrated in FIG. 10A. Here, an object E130, an object E134, and an object E136 are the objects on the standard processing layer, and an object E132 is the object on the special processing layer.

At this time, the print result in a case where the print icon B106 is selected is illustrated in FIG. 10B. Here, the print icon B106 is an icon for instructing a print output. The object E130, the object E134, and the object E136, which are the objects on the standard processing layer, are output in the print result, but the object E132 on the special processing layer is not output.

As described above, according to the present disclosure, it is easy to visually recognize a distinction between the object (object disposed in the normal processing layer) to be normally processed and the object (object disposed in the special processing layer) to be specially processed, among the objects input to the display device 10, and it is possible to switch the processing for the object simply and intuitively.

In addition, since only the object on the standard processing layer can be printed, it is possible to print only a part of the input object. It may be selected by the operation of a user whether to print only the object on the standard processing layer, or to combine the object on the standard processing layer and the object on the special processing layer and print the combined object (an output target is selected). With this configuration, it is possible to respond flexibly to a case where the user wants to print all the objects. Specifically, when the print icon B106 is selected, the user may be enabled to select the output target, or another icon for combining the standard processing layer and the special processing layer to print the resultant may be provided separately from the print icon B106.

In the embodiment described above, description on a function (so-called eraser function) for deleting the objects from the standard processing layer and the special processing layer is omitted, but it is needless to say that the embodiment may include an icon or processing for deleting the object. In addition, it is possible to input various objects, for example, graphics such as a circle, a straight line, and a rectangle, text, and the like.

2. Second Embodiment

Subsequently, a second embodiment will be described. In the first embodiment, the print device 20 is described as an example of an output destination, but in the present embodiment, a case where another output destination is used will be described.

Figure 11:
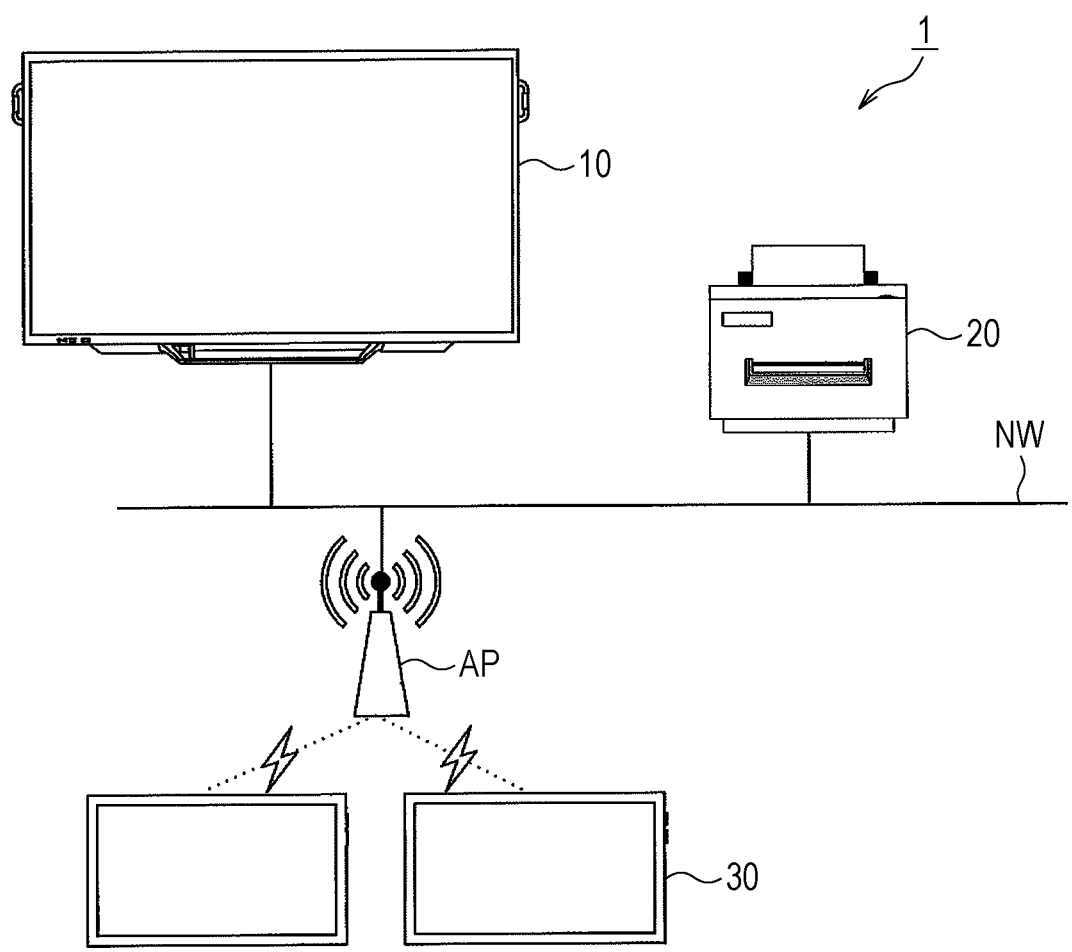
FIG. 11 is a diagram illustrating the entire configuration of a conference support system according to a second embodiment.

FIG. 11 is a diagram illustrating the entire configuration of a conference support system 2 according to the present embodiment. In the conference support system 2, one or a plurality of terminal devices 30 are connected to a network NW via an access point AP.

Here, a terminal device 30 is a display device other than the display device 10, may be a portable display device, and may be a display device or the like installed in another room. In addition, various devices such as a tablet, a smartphone, a television receiver, a car navigation system, and a wearable terminal can be used as the display device.

In addition, in the present embodiment, the terminal device 30 is wirelessly connected to the network NW via an access point AP and is capable of communicating with the display device 10. For example, the access point AP may be connected by a wireless LAN (IEEE802.11a/b/g) or the like or may be connected by a wire. In addition, the terminal device 30 may be directly connected through a short-distance wireless communication such as the Bluetooth (registered trademark) or the ZigBee (registered trademark) without using the network NW or may be connected through a wire by using the USB or the like.

Figure 12:
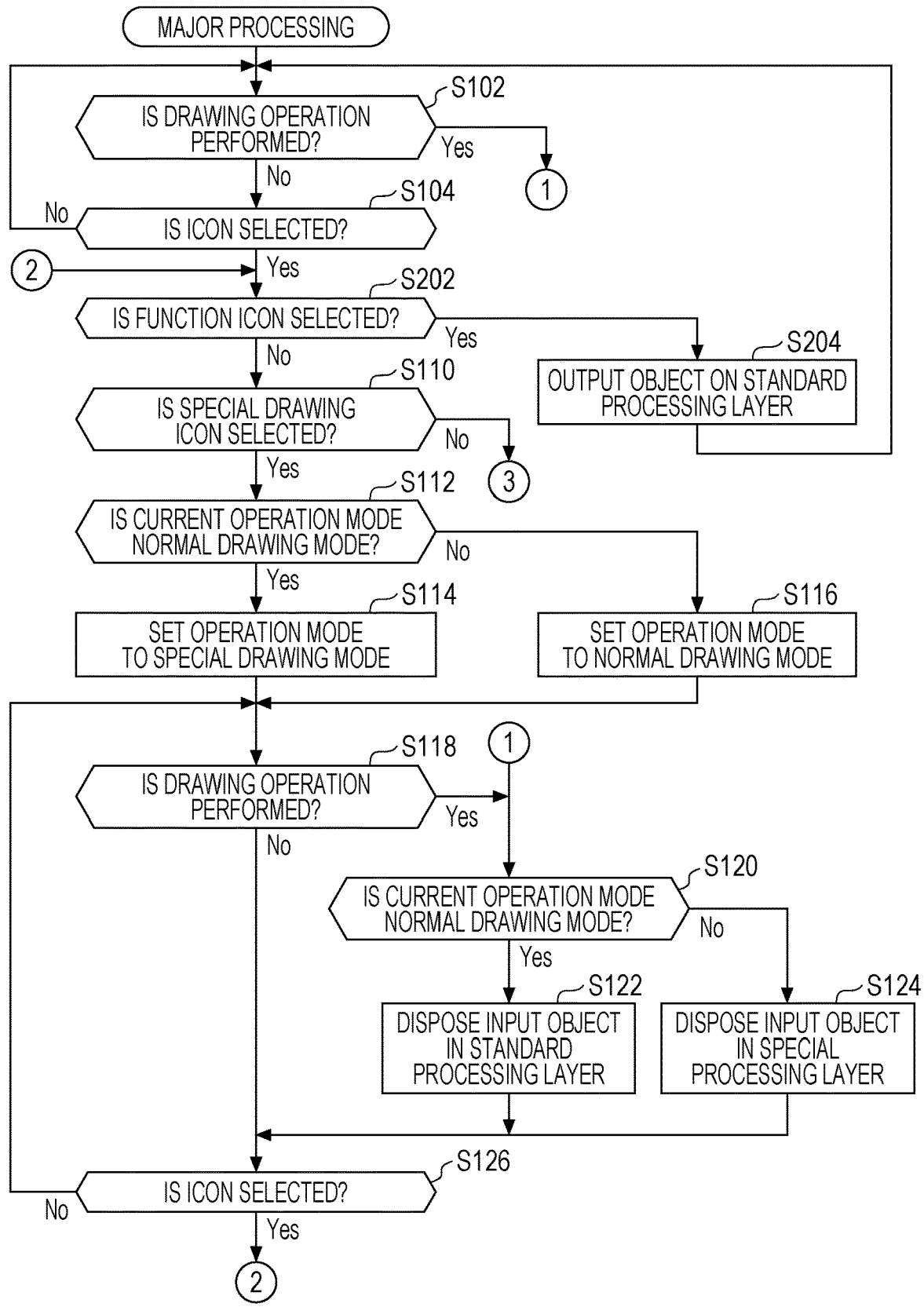
FIG. 12 is an operation flow illustrating major processing according to the second embodiment.
Figure 13:
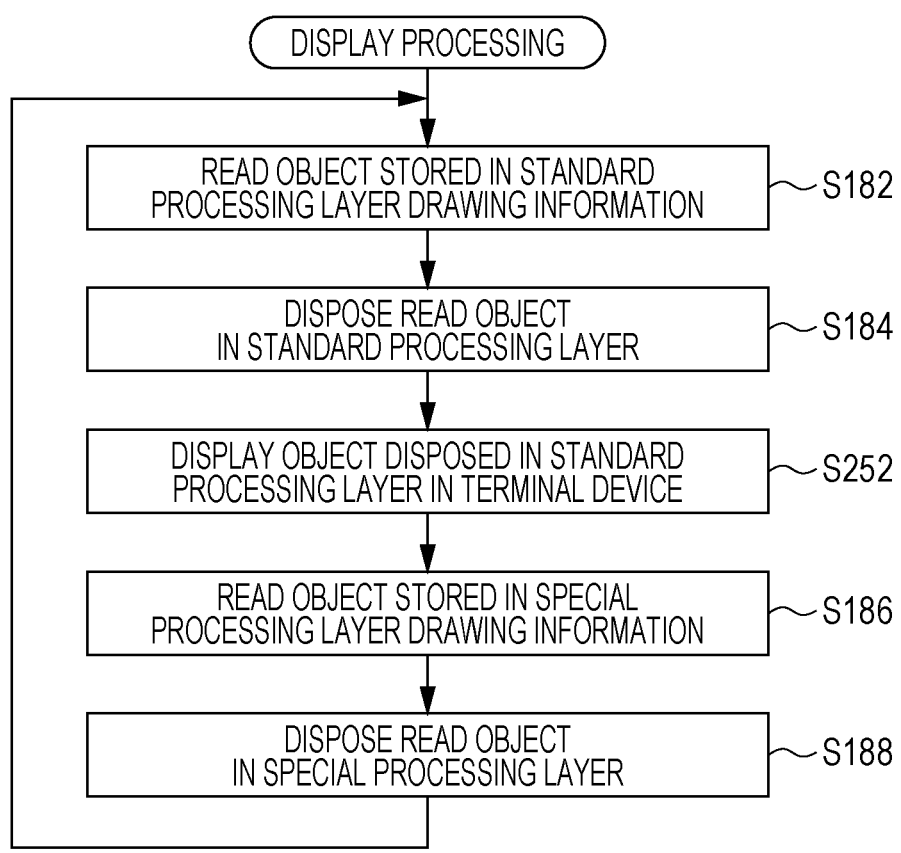
FIG. 13 is an operation flow illustrating display processing according to the second embodiment.

Here, an operation according to the present embodiment will be described. Since a functional configuration of the display device 10 is the same as the configuration according to the first embodiment, description thereof will be omitted. In addition, in the present embodiment, processing in each of FIG. 12 and FIG. 13 is performed instead of processing in each of FIG. 5 and FIG. 7 of the first embodiment, respectively. The same processing is denoted by the same reference numeral or symbol, and the description thereof will be omitted, and different points will be majorly described.

In the major process, whether or not a function icon is selected by a user is determined (step S202). Here, the function icon is an icon instructing the display device 10 to perform processing. It is assumed that the processing according to the present embodiment is, for example, storage processing, print processing, or processing of outputting a display screen to another terminal. In addition, in a case where the function icon is selected, the object on the standard processing layer is output according to the selected function icon (step S202; Yes→step S204).

For example, in a case where the storage icon is selected as the function icon, the object disposed in the standard processing layer is output to a file. In this case, the object disposed in the special processing layer is not output (stored).

In addition, in a case where the print icon is selected as the function icon, output processing is performed by printing in the same manner as in the first embodiment.

In addition, in a case where an icon that displays another terminal device is selected as the function icon, the object disposed in the standard processing layer is displayed on another terminal device. Whether or not to display on another terminal device may be selected according to, for example, an operation mode (mode in which the current display screen is displayed on another display device or a terminal device) of the display device 10, without selecting an icon.

For example, in the display processing of FIG. 13, after an object is displayed on the display device 10 in step S184, the object is also displayed on the terminal device (step S252). In the display device 10, in step S188, the object disposed in the special processing layer is also displayed, but the object disposed in the special processing layer is not displayed in the terminal device.

Figure 14A:
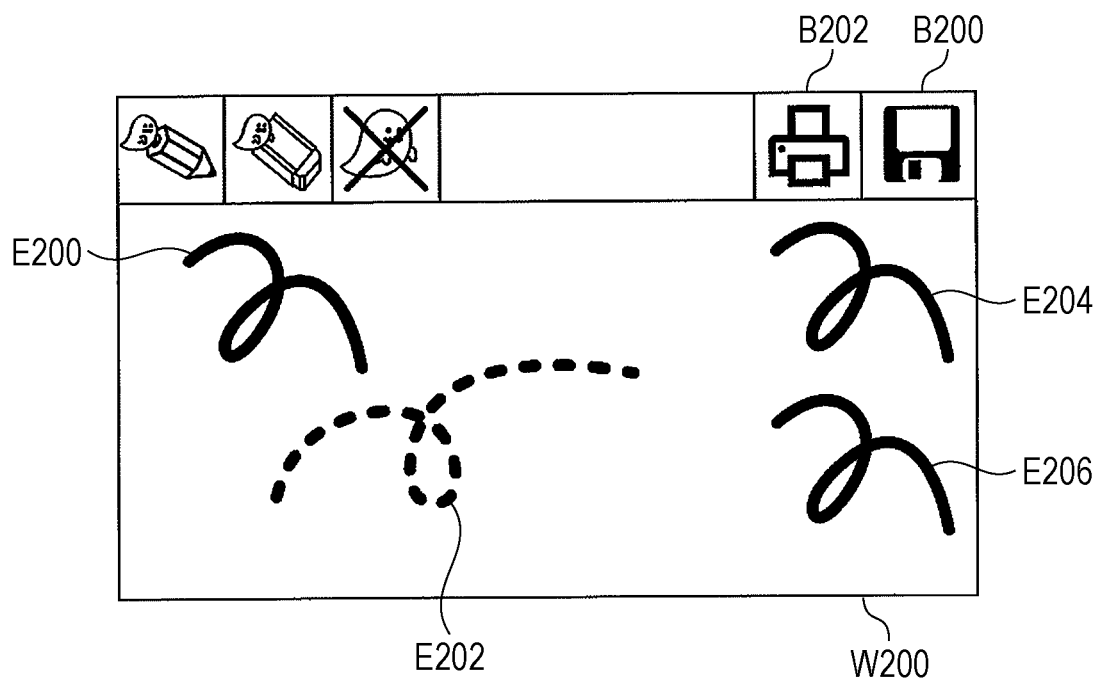
FIGS. 14A to 14C are diagrams illustrating an operation example according to the second embodiment.
Figure 14B:
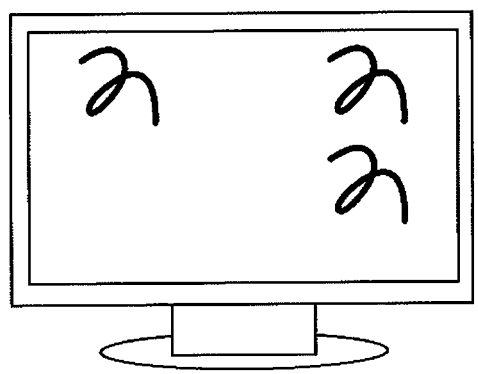
Figure 14C:
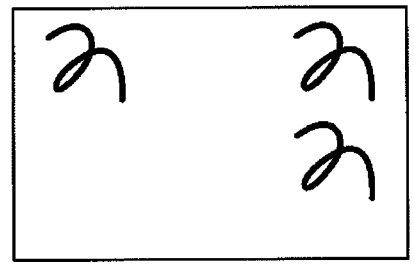

An operation example according to the present embodiment will be described with reference to FIGS. 14A to 14C. FIG. 14A illustrates an example of a display screen W200 displayed on the display unit 120 according to the present embodiment.

The display screen W200 displays objects E200, E204, and E206 disposed in the standard processing layer, and also displays an object E202 disposed in the special processing layer. In order to distinguishably display the objects disposed in the special processing layer, the object E202 is displayed by a different display (for example, a dotted line). In addition, the object may be displayed in an identifiable display aspect, and, if a user who views the display screen and explains can intuitively grasp the display aspect, the display aspect may be a balloon, a colored background, a frame display, or the like.

In addition, the display screen W200 displays a storage icon B200 and a print icon B202 serving as function icons. If the storage icon B200 is selected, only the object disposed in the standard processing layer is stored among the objects on the display screen W200. In addition, in a case where the print icon B202 is selected, only the object disposed in the standard processing layer is printed. While not illustrated, for example, an icon for outputting (for example, printing) data obtained by overlapping the background layer, the special processing layer, and the standard processing layer may be displayed. In a case where the icon is selected, data obtained by overlapping the object disposed in the background layer, the object disposed in the special processing layer, and the object disposed in the standard processing layer is output.

In addition, the display screen W200 is in an operation mode in which data is output to the terminal device 30. Thus, as illustrated in FIG. 14B, only the object disposed in the standard processing layer is displayed. FIG. 14C is a diagram illustrating data stored in a file (for example, in a PDF, a TIFF, or the like). Also in the present figure, only the object disposed in the standard processing layer is output (stored), and the object disposed in the special processing layer is not output (stored).

As described above, according to the present embodiment, the embodiment is not limited to printing only, it is possible to easily draw or switch an object to be output and an object not to be output, for other outputs, such as output to other devices and storage in an electronic file.

3. Third Embodiment

Subsequently, a third embodiment will be described. The third embodiment has the same configuration as the first embodiment, but a plurality of operation pens are connected to the display device 10, each of the operation pens and a layer which becomes an input destination are made to correspond to each other, and a layer input by the operation pen is switched.

Figure 5:
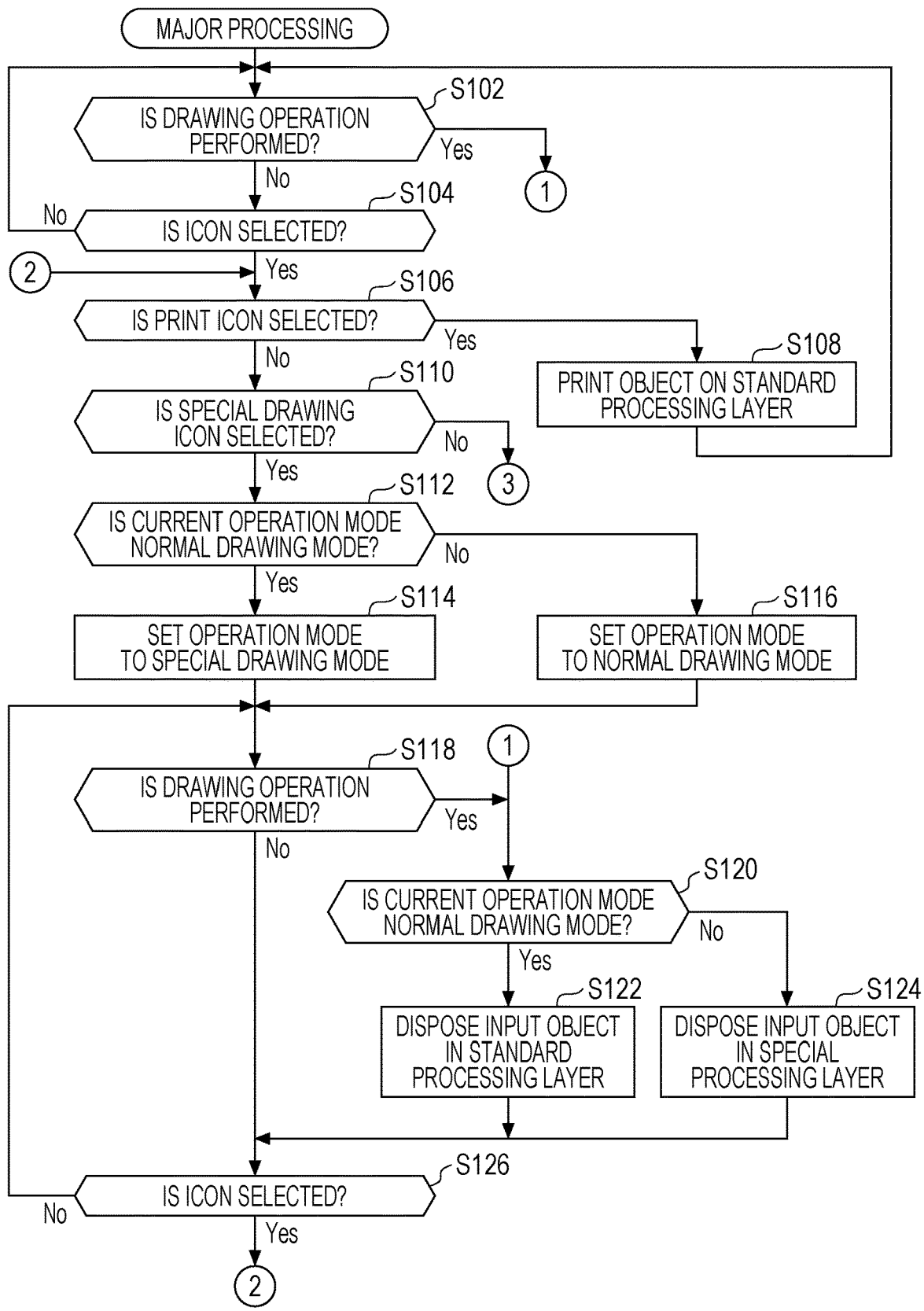
FIG. 5 is an operation flow illustrating major processing according to the first embodiment.
Figure 6:
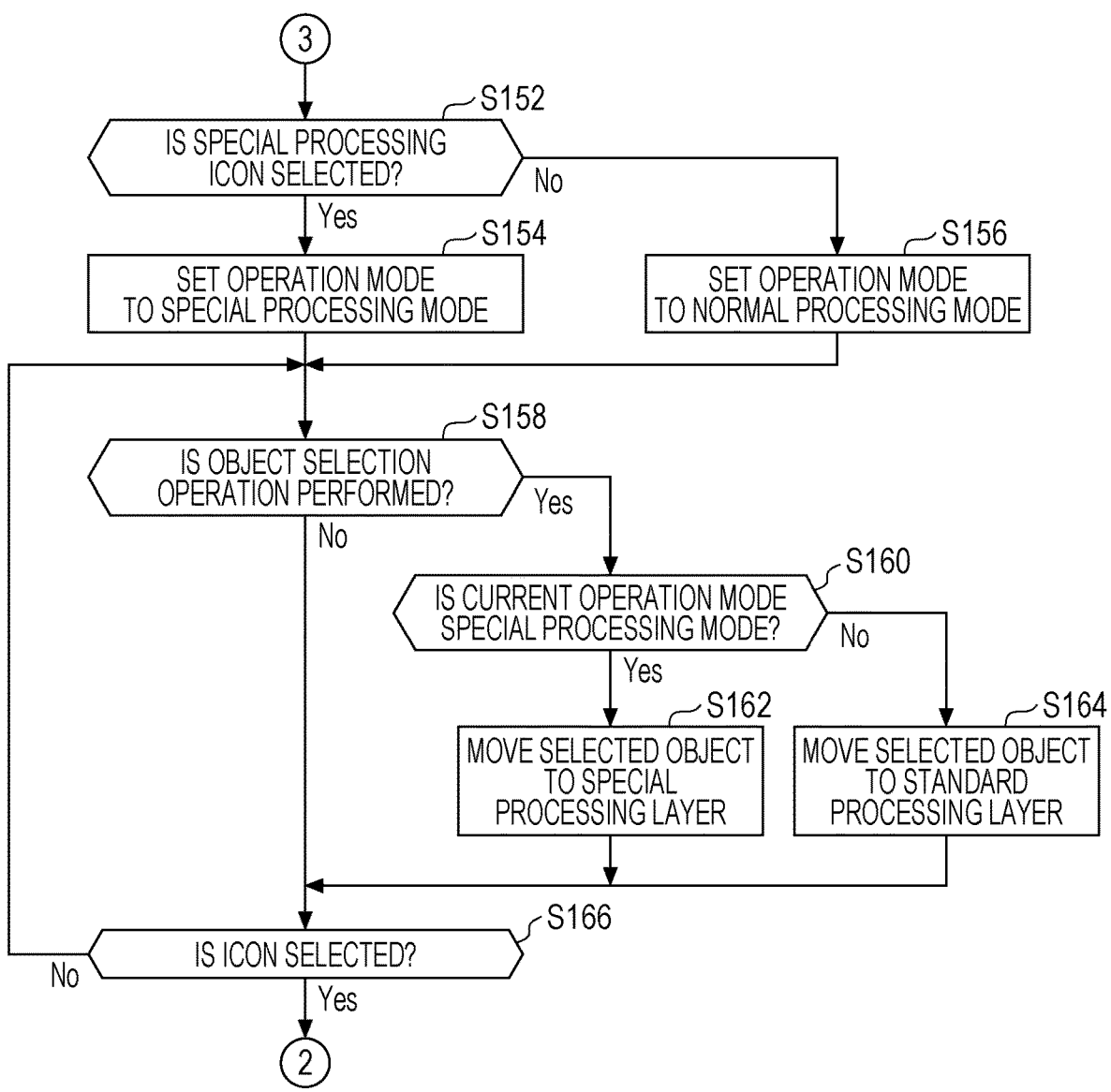
FIG. 6 is the operation flow illustrating the major processing according to the first embodiment.
Figure 15:
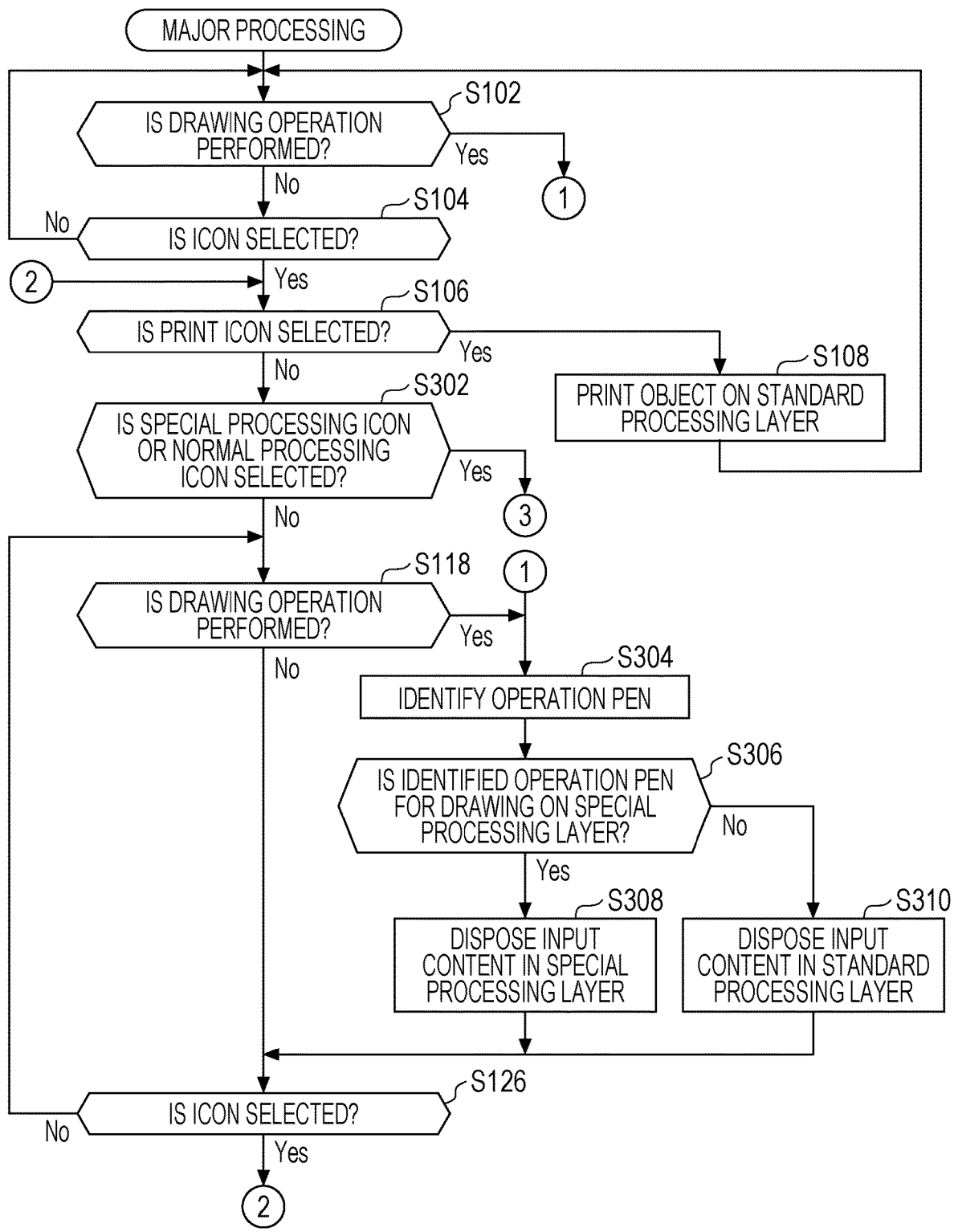
FIG. 15 is an operation flow illustrating major processing according to a third embodiment.

In the present embodiment, the processing of FIG. 5 according to the first embodiment is replaced with processing of FIG. 15. Here, since the functional configuration of the display device 10 according to the third embodiment is the same as the configuration according to the first embodiment, description thereof will be omitted. In addition, the same processing as the processing in FIG. 5 is denoted by the same reference numeral or symbol, and a detailed description thereof will be omitted.

In a case where the icon selected by a user is not the print icon, whether or not the selected icon is the special processing icon or the normal processing icon is determined (step S106; No→step S302). In a case where the selected icon is the special processing icon or the normal processing icon, the processing of step S152 is performed (step S302; Yes).

In a case where the user performs a drawing operation (step S118; Yes), the operation pen which performs the drawing is identified (step S304). For identification of the operation pen, unique identification information capable of identifying the operation pen may be used. In addition, in a case where there is a touch operation made by a finger, it can be treated as a case where the operation pen may not be identified.

Subsequently, whether the identified pen is a pen for drawing on the special processing layer is determined (step S306). For example, the identification information of the pen used for the drawing (operation) on the special processing layer is stored in the storage unit 150, and in a case where the operation pen specified by the stored identification information coincides with the operation pen identified in step S304, it may be determined that the identified pen is the pen for drawing on the special processing layer. In a case where the operation pen may not be identified, it may be determined that the identified pen is not a pen for drawing on the special processing layer.

In step S306, if the identified pen is a pen for drawing on the special processing layer, content rendered by the drawing operation is stored in the special processing layer drawing information 154 (step S306; Yes→step S308). In addition, if it is determined in step S306 that the identified pen is not the pen for drawing on the special processing layer, the content rendered by the drawing operation is stored in the standard processing layer drawing information 152 (step S306; No→step S310).

With this configuration, it is possible to dispose an object on either the standard processing layer or the special processing layer, based on the content rendered by the operation pen, without performing the mode switching made by the icon. Thereby, it is possible to improve convenience of a user. In the present embodiment, the operation pen and the layer which become an input destination are described as being associated with each other, but by associating the operation pen with the operation mode, the mode may be switched by the operation pen.

4. Fourth Embodiment

Subsequently, a fourth embodiment will be described. The fourth embodiment provides a plurality of pieces of the special processing layer drawing information 154 stored in the storage unit 150, depending on an output formation, in the configuration according to the first embodiment.

That is, the first embodiment provides two layers of the special processing layer and the standard processing layer, but the present embodiment provides a first special processing layer for disposing objects that are not output at the time of printing and storing, that is, objects that are only displayed, and a second special processing layer for disposing objects that are not output at the time of printing, that is, objects that are only stored and displayed.

Since two special processing layers are provided, it is possible to switch an object to be output by a user's selection operation. For example, when a print operation (for example, a print icon is touched) is made, an object disposed in the standard processing layer is output (printed), but objects disposed on the first special processing layer and the second special processing layer are not printed.

In addition/if a storage operation (for example, a storage icon is touched or a storage command is input) is performed, the objects disposed in the second special processing layer and the standard processing layer are output (stored), but the object disposed in the first special processing layer is not output.

In such cases, all the objects disposed in the first special processing layer, the second special processing layer, and the standard processing layer are displayed on the display screen. At this time, the display aspect (for example, a color, a thickness, transmittance, or a background color) of the object may be changed depending on the processing layer.

In applying the embodiments described above, as for the special processing mode, the object disposed in the standard processing layer may be moved onto a predetermined special processing layer (for example, the first special processing layer) or may be moved to the special processing layer designated by a user. In addition, each time the object is moved, the object may be sequentially moved onto the first special processing layer, the second special processing layer, and the standard processing layer.

As described above, according to the present embodiment, when the object is disposed, it is possible to perform an output intended by a user with an easy operation. Thereby, the user can output the object depending on a purpose.

5. Fifth Embodiment

Subsequently, a fifth embodiment will be described. The fifth embodiment has the same configuration as the first embodiment, but is an embodiment in which the processing layer on which an object is to be disposed is designated by a gesture instead of an operation performed by selecting an icon.

Figure 16:
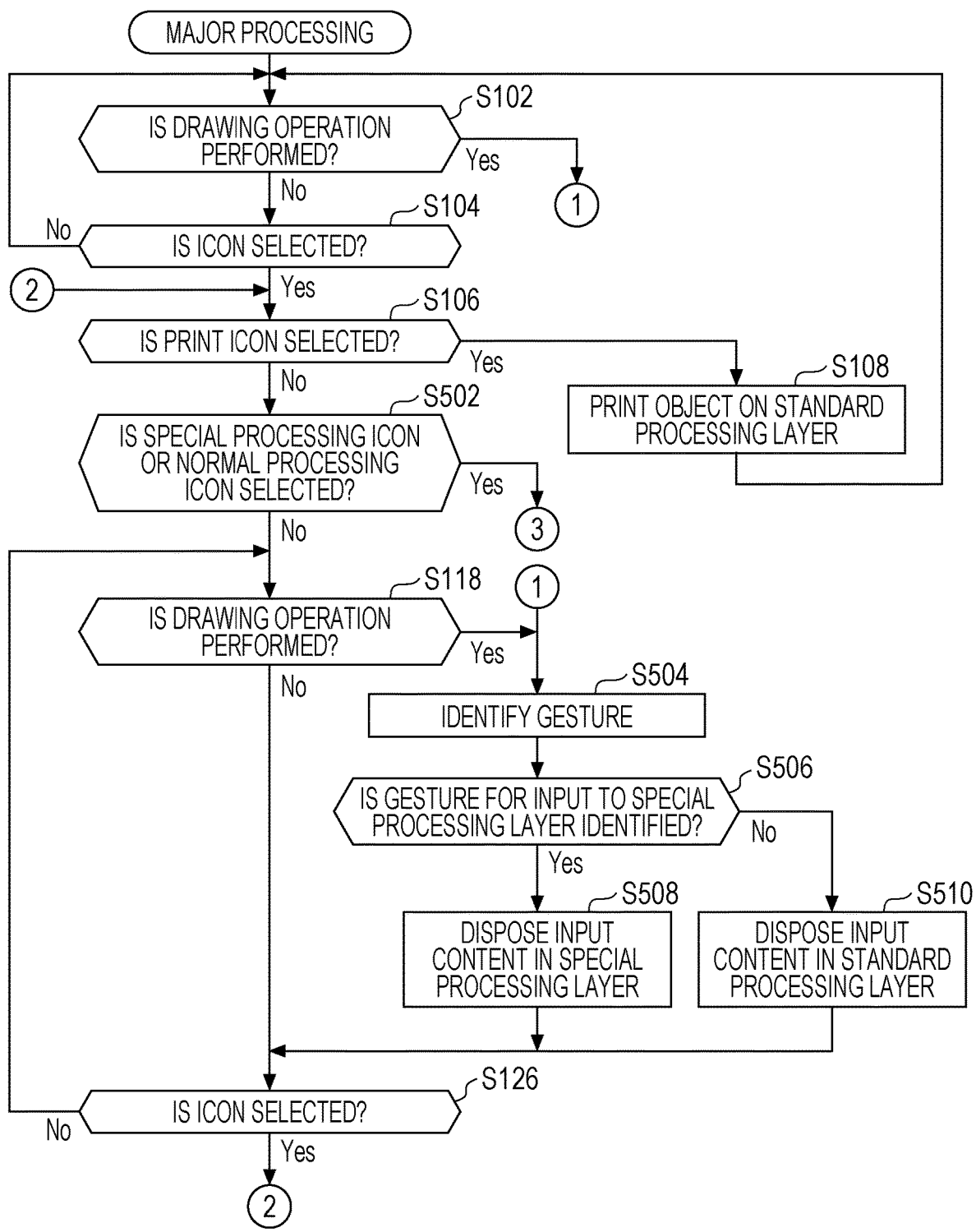
FIG. 16 is an operation flow illustrating major processing according to a fifth embodiment.

In the present embodiment, the processing of FIG. 5 according to the first embodiment is replaced with processing of FIG. 16. Here, since a functional configuration of the display device 10 according to the fifth embodiment is the same as the configuration according to the first embodiment, description thereof will be omitted. In addition, in FIG. 15, the same processing as the processing in FIG. 5 is denoted by the same reference numeral or symbol, and detailed description thereof will be omitted.

A gesture is a predetermined operation accompanied by a drawing operation when the drawing operation is performed. An example of the gesture includes an operation such as touching, swiping, or flicking performed by two fingers or three fingers, or touching the display unit 120 with the palm, with the other hand, an operation pen, or the like performing drawing. That is, by detecting the operation, which is performed by the user and is accompanied by the drawing operation, and by identifying the operation, the input object can be disposed in a predetermined layer.

In a case where the icon is selected and the selected icon is not a print icon, whether or not the selected icon is the special processing icon or the normal processing icon is determined (step S106; No→step S502). In a case where the selected icon is the special processing icon or the normal processing icon, the processing moves to step S152 (step S502; Yes).

In a case where the selected icon is neither the special processing icon nor the normal processing icon (step S502; No), whether or not the drawing operation is performed by a user is determined (step S118). In a case where the drawing operation is performed, a gesture accompanied by the drawing operation is detected, and the gesture is identified (step S118; Yes→step S504).

Subsequently, in a case where the identified gesture is a gesture for input to the special processing layer, the object is disposed in the special processing layer, based on the drawing operation (step S506; Yes→step S508). In a case where the identified gesture is not the gesture for input to the special processing layer, the object is disposed in the standard processing layer (step S506; No→step S510).

The determination as to whether or not the identified gesture is the gesture for input to the special processing layer may be made according to, for example, whether or not the predetermined gesture for input to the special processing layer coincides with the gesture identified in step S504.

As described above, according to the present embodiment, it is possible to dispose the object rendered according to the gesture operation on either the standard processing layer or the special processing layer without the mode switching performed by the icon. Thereby, it is possible to improve convenience of a user. In the present embodiment, it is described that the gesture and the layer which becomes an input destination are made to correspond to each other, but by associating the gesture with the operation mode, the mode may be switched by the gesture.

6. Sixth Embodiment

Subsequently, a sixth embodiment will be described. The sixth embodiment is different from the embodiments described in the first embodiment and the second embodiment in that layer information of an object is stored as an attribute for each object. In addition to this, information on an output destination is stored and managed for each layer.

In the sixth embodiment, as illustrated in FIGS. 17A and 17B, the information stored in the storage unit according to the first embodiment is divided into drawing information illustrated in FIG. 17A and layer information illustrated in FIG. 17B. That is, an output form is switched based on the corresponding layer, based on the layer attribute set for each input object.

Figure 7:
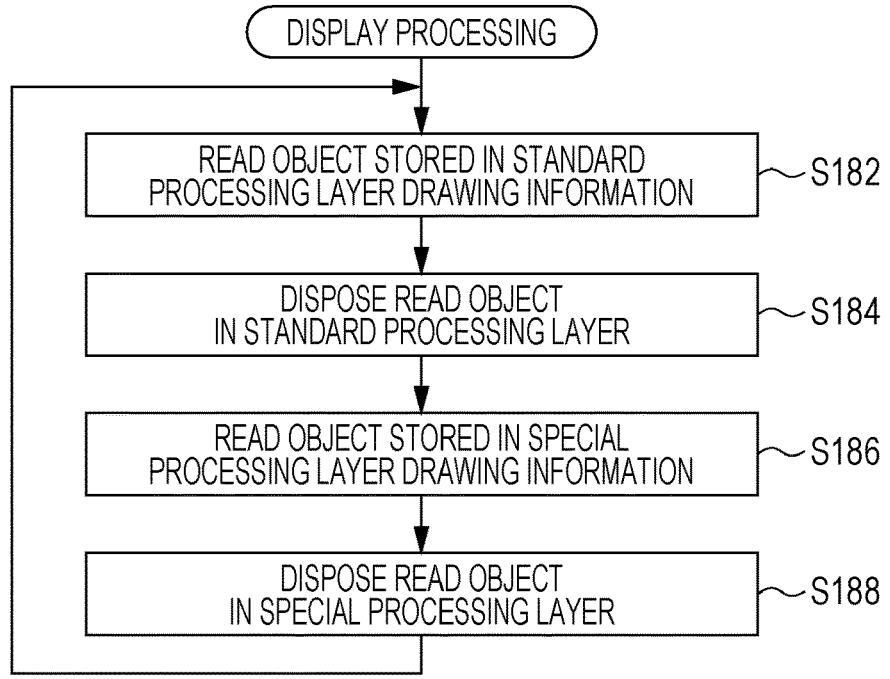
FIG. 7 is an operation flow illustrating display processing according to the first embodiment.
Figure 18:
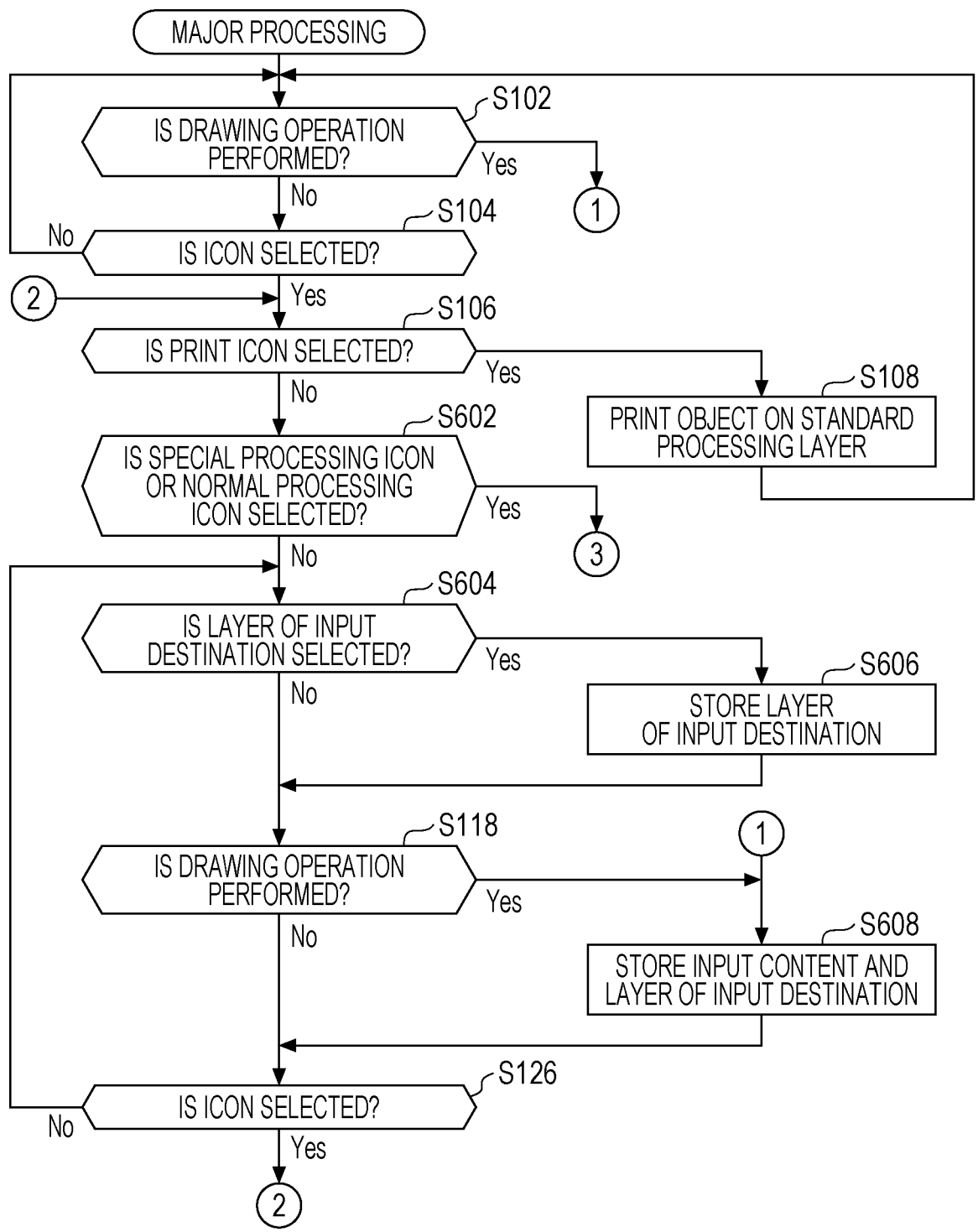
FIG. 18 is an operation flow illustrating major processing according to the sixth embodiment.
Figure 19:
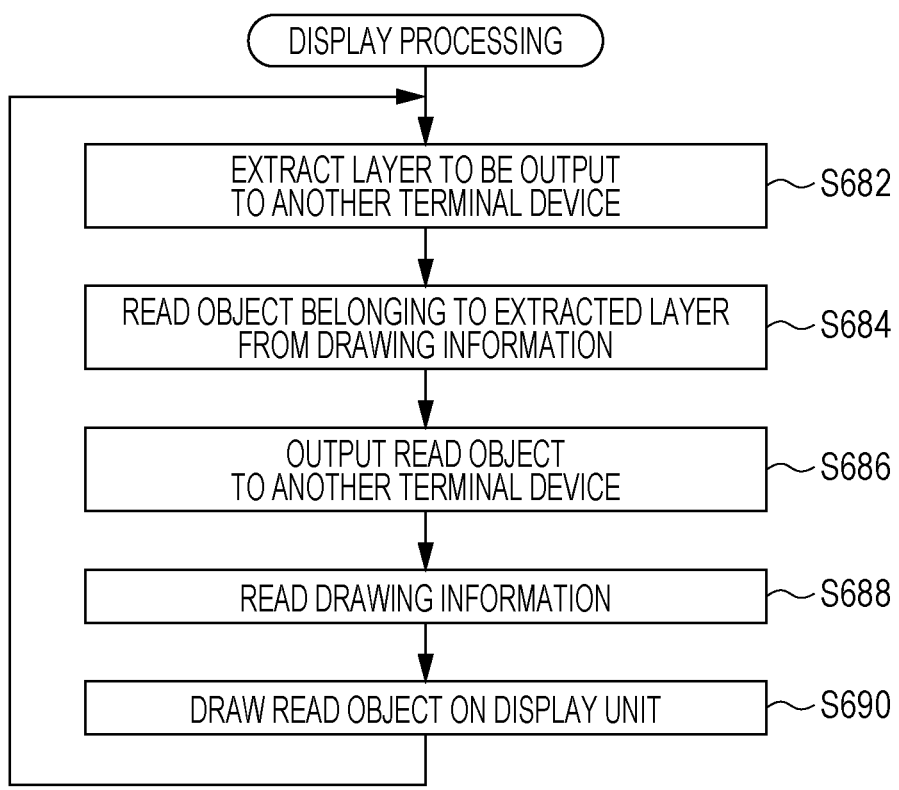
FIG. 19 is an operation flow illustrating display processing according to the sixth embodiment.

In the present embodiment, the processing of FIG. 5 according to the first embodiment is replaced with processing of FIG. 18, and the processing of FIG. 7 according to the first embodiment is replaced with processing of FIG. 19. Here, a functional configuration of the display device 10 according to the sixth embodiment is different from the functional configuration according to the first embodiment, and the information stored in the storage unit 150 is different as described above. In addition, the same processing as the processing of FIG. 5 is denoted by the same reference numeral or symbol, and detailed description thereof will be omitted.

The drawing information stored in the storage unit 150 will be described with reference to FIG. 17A. The drawing information according to the present embodiment stores an object type (for example, "circle"), object data (for example, "center=(100 and 100), radius=20, thickness=2, and color=#000000"), and a layer name (for example, "layer 1"). Among these, the object type and the object data are the same as the object type and the object data of the first embodiment. In addition, the layer name is information indicating in which of the layers the object is disposed.

FIG. 17B illustrates the layer information. The layer information includes a layer name for identifying the layer, and an output method. Whether or not each of storing in a file, printing, and displaying in another terminal device is performed is stored as the output method. For example, for the object disposed in the layer named "layer 1", it is stored that ail of storing in a file, printing, and displaying in another terminal device are performed. Thus, the layer is the same as the standard processing layer. Meanwhile, "layer 3" is the same layer as the special processing layer because the layer 3 does not perform an output. There may be a layer that performs a partial output like "layer 2".

The layer information may include a predetermined layer in advance, or a layer may be added, modified, or deleted by a user. In addition, the layer information may also include an attribute other than the layer name and the output method. For example, an attribute such as "adding an object" may be added, and a layer to which the attribute is set "not allowed" may be set as a layer to which the object input by the user may not be added. In this case, the layer corresponding to the normal processing layer is represented as a layer in which storing in a file, printing, and displaying in another terminal device are performed and adding the object is allowed. Meanwhile, the background layer is represented as a layer in which storing in a file, printing, and displaying in another terminal device are performed but adding the object is not allowed.

Here, in the drawing information of FIG. 17A, for example, a free curved line is an object disposed in the layer 2 and is stored in a file and displayed in another terminal device but is not output during printing.

Major processing of the present embodiment will be described with reference to FIG. 18. In a case where an operation of selecting an icon is performed and the selected icon is not a print icon, whether or not the selected icon is a special processing icon or a normal processing icon is determined (step S106; No→step S602). In a case where the selected icon is the special processing icon or the normal processing icon, the processing of step S152 is performed (step S602; Yes).

Subsequently, whether or not a layer in which the object is disposed is selected is determined (step S604). For the layer selection, a layer list may be displayed on the display unit 120 and the layer may be selected from the list, or the layer may be selected from an icon or the like. In a case where the layer is selected, the selected layer is temporarily stored (step S604; Yes→step S606).

Subsequently, in a case where the user performs the drawing operation, the object input by the drawing operation is stored in the drawing information with the selected layer information added as an attribute (step S102; Yes→step S608 or step S118; Yes→Step S608).

In addition, for the display processing, a layer to be output to another terminal device is first extracted from the layer information (step S682), and the object disposed in the layer extracted in step S682 is read from the drawing information (step S684). Subsequently, the object read in step S684 is output to another terminal device so as to perform a display control (step S686). Thereby, only the object read in step S684 is displayed on the display unit of another terminal device.

In addition, all of the drawing information is read (step S688), and the read object is displayed on the display unit 120 (step S690). Thereby, the objects disposed in all the layers are displayed on the display unit 120 of the display device 10.

In the present embodiment, the drawing information is stored so as to associate the object with the layer, but a configuration may be provided in which an attribute indicating an output destination is stored for each object.

As described above, according to the present embodiment, an object can be disposed in a layer corresponding to an output destination, and the user can control the output more flexibly.

7. Seventh Embodiment

Subsequently, a seventh embodiment will be described. The seventh embodiment has the same configuration as the first embodiment, but is an embodiment in which an object disposed in the special processing layer is moved to the standard processing layer by a predetermined operation.

For example, an operation mode such as a draft mode is prepared. An object input in this operation mode is stored in the special processing layer drawing information 154. Thereafter, when the draft mode is released, a user is inquired of whether or not to move the drawing information stored in the special processing layer drawing information 154 to the standard processing layer drawing information 152.

In a case where the drawing information is moved, all the drawing information stored in the special processing layer drawing information 154 is moved to the standard processing layer drawing information 152. Meanwhile, in a case where the drawing information is not moved, all the drawing information stored in the special processing layer drawing information 154 is deleted. That is, the special processing layer drawing information 154 is used as a primary buffer.

With this configuration, it is possible to determine whether or not to move a certain amount of input to the standard processing layer. For example, in a case where a certain degree of free drawing operation is performed in a brainstorming meeting or the like and whether or not to collectively keep an input content is determined, user's convenience can be expected to be improved by the present embodiment.

8. Modification Example

As described above, although embodiments according to the present disclosure are described in detail with reference to the drawings, the specific configuration is not limited to the embodiments, and a design and the like within a range not deviating from the gist of the present disclosure is also included in the scope of Claims.

For the sake of convenient description, the embodiments described above are described separately, but can be combined to be implemented within a possible range. For example, by combining the first embodiment, the second embodiment, and the fifth embodiment, a user can select a layer on which an object is disposed by selection of an icon, an operation pen, and a gesture. Thereby, improvement of the user's convenience can be expected.

In the above-described embodiment, a stationary display device capable of detecting an operation input is described as an example of a display device, but it is obvious that it can be applied to a device as long as the device can realize the same thing. For example, the embodiment may be realized by displaying a display screen on a white board or a wall surface using a projector and detecting a touch operation or a pen operation using the projector or a separate detection device. The projector may be a wall hanging type or a desk type. That is, the display device includes an integrated type device capable of performing display and operation detection together, and a separate type device in which the display and the operation detection are performed separately.

In addition, in the embodiment, a program being executed by each device is a program (program for causing a computer to function) for controlling a CPU or the like so as to realize the functions of the above-described embodiments. Information treated by the device is temporarily stored in a temporary storage device (for example, a RAM) at the time of processing, and thereafter is stored in various storage devices such as a ROM, a HDD, and an SSD, and is read by the CPU or correction and writing are performed thereon as demanded.

In addition, in a case where a program is distributed to a market, the program can be stored in a portable recording medium to be distributed, or can be transferred to a server computer connected via a network such as the Internet. In this case, it is obvious that a storage device of the server computer is also included in the present disclosure.

The present disclosure contains subject matter related to that disclosed in Japanese Priority Patent Application JP 2017-203816 filed in the Japan Patent Office on Oct. 20, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
   a display unit that displays a plurality of objects disposed in a layer on a display screen;
   an output unit that outputs the plurality of objects;
   a mode switching unit that switches a mode between a first mode, a second mode, and a third mode; and
   an object disposing unit that disposes one or more of first objects of the plurality of objects in a first layer when the mode is the first mode, disposes one or more of second objects of the plurality of objects different from the one or more of first objects in a second layer when the mode is the second mode,
   an object moving unit that moves a third object selected by a user among the one or more of second objects from the second layer to the first layer when the mode is the third mode,
   wherein the display unit displays the one or more of first objects disposed in the first layer and the one or more of second objects disposed in the second layer, and
   wherein the output unit outputs the one or more of first objects disposed in the first layer.

2. The display device according to claim 1,
   wherein the output unit combines the one or more of first objects disposed in the first layer with the second object disposed in the second layer and outputs the combined object.

3. The display device according to claim 1,
   wherein the output unit outputs the one or more of first objects disposed in the first layer by printing the object using a print device, storing the object in a file, or displaying the object on another connected terminal device.

4. The display device according to claim 1,
   wherein the mode switching unit switches a mode by selecting a mode switching button displayed on the display screen.

5. The display device according to claim 1,
   wherein a plurality of operation pens is connected to the display device, and
   wherein the mode switching unit switches a mode in association with one of the plurality of the operation pens.

6. The display device according to claim 1, further comprising
   an operation detection unit that detects an operation on the display screen,
   wherein the mode switching unit switches a mode in a case where an operation detected by the operation detection unit is a predetermined operation.

7. The display device according to claim 1,
   wherein the display unit displays the one or more of first objects disposed in the first layer and the second object disposed in the second layer in different display modes.

8. The display device according to claim 7,
   wherein the display unit displays the one or more of second objects disposed in the second layer in a display mode of frame display, transmission display or thin color display.

9. A display method of a display device, comprising:
   displaying a plurality of objects disposed in a layer on a display screen;
   outputting the plurality of objects;
   switching a mode between a first mode, a second mode, and a third mode; and
   disposing one or more of first objects of the plurality of objects in a first layer when the mode is the first mode, disposing one or more of second objects of the plurality of objects different from the one or more of the first objects in a second layer when the mode is the second mode,
   moving a third object selected by a user among the one or more of second objects from the second layer to the first layer when the mode is in the third mode,
   wherein, in the displaying, the one or more of first objects disposed in the first layer and the one or more of second objects disposed in the second layer are displayed, and
   wherein, in the outputting, the one or more of first objects disposed in the first layer is output.

10. A non-transitory recording medium storing a program for causing a computer mounted in a display device to execute functions comprising:
    displaying a plurality of objects disposed in a layer on a display screen;
    outputting the plurality of objects;
    switching a mode between a first mode, a second mode, and a third mode; and
    disposing one or more of first objects of the plurality of objects in a first layer when the mode is the first mode, disposing one or more of second objects of the plurality of objects different from the one or more of the first objects in a second layer when the mode is the second mode,
    moving a third object selected by a user among the one or more of second objects from the second layer to the first layer when the mode is the third mode,
    wherein, in the displaying, the one or more of first objects disposed in the first layer and the one or more of second objects disposed in the second layer are displayed, and
    wherein, in the outputting, the one or more of first objects disposed in the first layer is output.

* * * * *